US008752211B2

(12) United States Patent
Kalinin et al.

(10) Patent No.: US 8,752,211 B2
(45) Date of Patent: Jun. 10, 2014

(54) REAL SPACE MAPPING OF OXYGEN VACANCY DIFFUSION AND ELECTROCHEMICAL TRANSFORMATIONS BY HYSTERETIC CURRENT REVERSAL CURVE MEASUREMENTS

(75) Inventors: Sergei V. Kalinin, Knoxville, TN (US); Nina Balke, Knoxville, TN (US); Albina Y. Borisevich, Knoxville, TN (US); Stephen Jesse, Knoxville, TN (US); Petro Maksymovych, Knoxville, TN (US); Yunseok Kim, Guyeonggi-do (KR); Evgheni Strelcov, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 6 days.

(21) Appl. No.: 13/566,327

(22) Filed: Aug. 3, 2012

(65) Prior Publication Data

US 2014/0041085 A1 Feb. 6, 2014

(51) Int. Cl.
*G01Q 60/44* (2010.01)

(52) U.S. Cl.
USPC .......................................................... 850/43

(58) Field of Classification Search
USPC ................ 850/43; 250/234; 73/105; 977/863
See application file for complete search history.

(56) References Cited

U.S. PATENT DOCUMENTS

| | | | | |
|---|---|---|---|---|
| 5,289,004 A * | 2/1994 | Okada et al. | ....................... | 850/1 |
| 6,497,141 B1 * | 12/2002 | Turner et al. | ..................... | 73/105 |
| 7,563,533 B2 | 7/2009 | Haile et al. | ...................... | 429/40 |
| 2005/0050947 A1 * | 3/2005 | Kitajima et al. | ................ | 73/105 |
| 2005/0081609 A1 * | 4/2005 | Worledge | ......................... | 73/105 |
| 2005/0262930 A1 * | 12/2005 | Shao et al. | ....................... | 73/105 |
| 2006/0016251 A1 * | 1/2006 | Hinterdorfer et al. | .......... | 73/105 |
| 2006/0123895 A1 * | 6/2006 | Lee et al. | ......................... | 73/105 |
| 2008/0054928 A1 * | 3/2008 | Shigeno et al. | ............... | 324/762 |
| 2009/0100554 A1 * | 4/2009 | Arnold et al. | .................... | 850/39 |
| 2009/0229020 A1 * | 9/2009 | Adams et al. | .................... | 850/33 |
| 2010/0024082 A1 * | 1/2010 | Ando et al. | ..................... | 850/33 |
| 2010/0115673 A1 * | 5/2010 | Kranz et al. | ..................... | 850/30 |
| 2011/0321202 A1 * | 12/2011 | Kartik et al. | ..................... | 850/1 |

OTHER PUBLICATIONS

Dodrill, First-Order-Reversal-Curve (FORC) Measurements of Magnetic Meterials, Lake Shore Cryotonics, Inc.*
Carvallo et al., Micromagnetic Modeling of First-Order Reversal Curve (FORC) Diagrams for Single-Domain and Pseudo-Single-Domain Magnetite, May 30, 2003, Earth and Planetary Science Letters 213, pp. 375-390.*
Arruda et al., Mapping Irreversible Electrochemical Processes on Nanoscale: Ionic Phenomena in Li Ion Conductive Glass Ceramics, Aug. 24, 2011, Nano Lett. 11 (10), pp. 4161-4167.*

(Continued)

*Primary Examiner* — Nicole Ippolito
*Assistant Examiner* — Jason McCormack
(74) *Attorney, Agent, or Firm* — Brinks Gilson & Lione (57) ABSTRACT

An excitation voltage biases an ionic conducting material sample over a nanoscale grid. The bias sweeps a modulated voltage with increasing maximal amplitudes. A current response is measured at grid locations. Current response reversal curves are mapped over maximal amplitudes of the bias cycles. Reversal curves are averaged over the grid for each bias cycle and mapped over maximal bias amplitudes for each bias cycle. Average reversal curve areas are mapped over maximal amplitudes of the bias cycles. Thresholds are determined for onset and ending of electrochemical activity. A predetermined number of bias sweeps may vary in frequency where each sweep has a constant number of cycles and reversal response curves may indicate ionic diffusion kinetics.

14 Claims, 11 Drawing Sheets

(56) References Cited

OTHER PUBLICATIONS

Altman, Eric I. et al., "*Mechanisms, Kinetics, and Dynamics of Oxidation and Reactions on Oxide Surfaces Investigated by Scanning Probe Microscopy*," Advanced Materials, vol. 22, Issue 26-27 (2010) pp. 2854-2869.

Custance, Oscar et al., *Atomic Force Microscopy as a Tool for Atom Manipulation*, Nature Nanotechnology, vol. 4, (2009) pp. 803-810.

Gao, Peng et al., "*Electrically Driven Redox Process in Cerium Oxides*," Journal of the American Chemical Society 132, 12, (2010) pp. 4197-4201.

Yoshida, Kenta et al., *Direct Observation of Oxygen Atoms in Rutile Titanium Dioxide by Spherical Aberration Corrected High-Resolution Transmission Electron Microscopy*, Nanotechnology, vol. 17, No. 15, (2006) pp. 3944-3950.

Zhang, Zaoli et al., "*Direct Atom-Resolved Imaging of Oxides and Their Grain Boundaries*," Science 31, vol. 302, 5646, (2003.) pp. 846-849.

* cited by examiner

REAL SPACE MAPPING OF OXYGEN VACANCY DIFFUSION AND ELECTROCHEMICAL TRANSFORMATIONS BY HYSTERETIC CURRENT REVERSAL CURVE MEASUREMENTS

STATEMENT REGARDING FEDERALLY FUNDED RESEARCH AND DEVELOPMENT

This invention was made with government support under Contract No. DE-AC05-00OR22725 between UT-Battelle, LLC. and the U.S. Department of Energy. The government has certain rights in the invention.

BACKGROUND OF THE INVENTION

1. Technical Field

The present disclosure relates to measurement apparatuses and methods and, more particularly, to the qualitative and quantitative mapping of ionic diffusion and electrochemical transformations in materials using scanning probe microscopy and related methods on the nanometer scale.

2. Related Art

Electrochemical energy conversion systems based on gas-solid interactions, including fuel cells and metal-air batteries are of high priority in several areas of research and industry, for example, vehicular technologies and large-scale energy production from bio-fuels and fossil fuels. Implementation of fuel cells may be limited by relatively low power densities. However, energy densities may rival those of energy combustion engines. Since metal-air batteries possess slow charge and discharge rates, low power densities, limited number of charge and discharge cycles (fading), and energy densities well below what is theoretically possible, may occur. The last decade has seen an intensive effort to understand atomistic and mesoscopic mechanisms which are involved in battery and fuel cell development. This effort was driven by a goal to improve energy and power densities, device life times and high-voltage materials and systems.

The operation of energy conversion and storage systems is underpinned by a series of complex mechanisms, most prominently including ion and vacancy diffusion, electronic transport, solid-gas reactions and solid-liquid reactions at surfaces and triple-phase junctions. These processes may be controlled by structural defects and morphologic features of material that provide channels for ion and electron transport and reactive sites for electrochemical reactions. A recognized example of such behavior is electrocatalysis and triple-phase junction behavior in fuel-cell materials. This behavior directly underpins functionality and is virtually inaccessible to conventional microscopic and surface-science methods. However, even for materials and devices where vacancy formation and local reactivity are not a primary functionality, for example, in lithium insertion chemistries, they often determine pathways and localization of stray electrochemical reactions and processes and thus, may determine the life-time of a device. The importance of these considerations may be readily illustrated by the fact that relatively low-voltage, low energy density, but highly stable olivine cathodes currently dominate the automotive energy storage markets.

SUMMARY

An excitation of varying voltage bias sweeps is applied to an ionic conducting material sample over a nanoscale grid. The bias sweeps may have the form of a modulated voltage ranging in amplitude from a certain voltage to a maximal voltage and back to initial state, with increasing maximal amplitudes over time. Current response reversal curves are measured at a plurality of grid locations. Reversal curves may be averaged over the grid for each bias cycle and their hysteresis loop areas may be plotted vs. maximal bias amplitudes for each bias cycle. Thresholds may be determined for the onset and ending of electrochemical activity either at individual locations or on averaged current-voltage curves. A predetermined number of bias sweeps may vary in frequency where each sweep may have a constant number of cycles and reversal response curves may indicate ionic diffusion kinetics.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The described system maps ionic diffusion or electrochemical reactivity in a material. The system may probe ion diffusivity and electrochemical reactivity on nanometer length scales, within electrochemically active surfaces utilizing scanning probe microscopy (SPM) based techniques. The system may also probe ion diffusivity and electrochemical reactivity in packaged devices. The results may provide insight into energy conversion and energy storage device operation on a single structural element level. Such understanding of mechanisms in nanoscale structures including the interplay between interfacial electrochemical reactions, oxygen vacancy diffusion, and structural defects may contribute to the development of high energy density and high power density materials which may be used in, for example, secondary batteries, fuel cells and air-battery operation. Scanning probe microscopy (SPM) based techniques may provide high resolution imaging of various material properties in host compounds. Properties of electrochemically active storage materials may be characterized at the nanoscale level using SPM based techniques.

Characteristics of ionic diffusion and electrochemical reactivity may be determined based on direct detection of a degree of voltage dependent current reversibility and hysteresis in standard current based measurements. Oxygen, hydrogen or, more generally, ion flow imaging may include a two-step, first-order reversal curve measurement process based on current and/or voltage detection. The measurement process may be sensitive to properties of a material, which may be coupled to oxygen vacancy concentration (but may not be coupled to vacancy concentration per se). Imaging and spectroscopic processes may comprise application of voltage bias to an SPM tip electrode or a top electrode with electrochemical functionality in a controlled environment. With regard to voltage-dependent current detection, in instances when current flow is purely electronic and does not cause electrochemical change to a system which mediates the current flow, one may not expect hysteresis curves to occur as result of an applied varying voltage. An exception may be that some amount of hysteresis which may be related to instrument operation and/or local heating effects may occur. These effects may be ascertained and accounted for based on estimates of dissipated power and/or knowledge of thermal conductivity. However, in instances when current induces an electrochemical change in a material's behavior, for example, when vacancy diffusion, proton diffusion, amorphization crystallization or other phase changes occur and which may have inherently slow dynamics, hysteresis loops may open up in the mapped current response to an applied varying voltage. Mapping the loop openings for a series of voltage sweeps applied to a test material where each voltage sweep comprises an alternating wave with increasing amplitude over time and each voltage sweep comprises a greater number of cycles which reach greater voltage deviations, may indicate an onset of the material's electrochemical change process and/or kinetics of processes within material under test. Moreover mapping current loop openings for a series of voltage sweeps, each sweep having a given number of cycles and each sweep having an increased frequency, may indicate ion kinetics in the test material, for example, an onset of slow ion dynamics. These measurements may comprise 2D spectroscopy rather than 1D spectroscopy such as current, voltage measurements.

Figure 1:
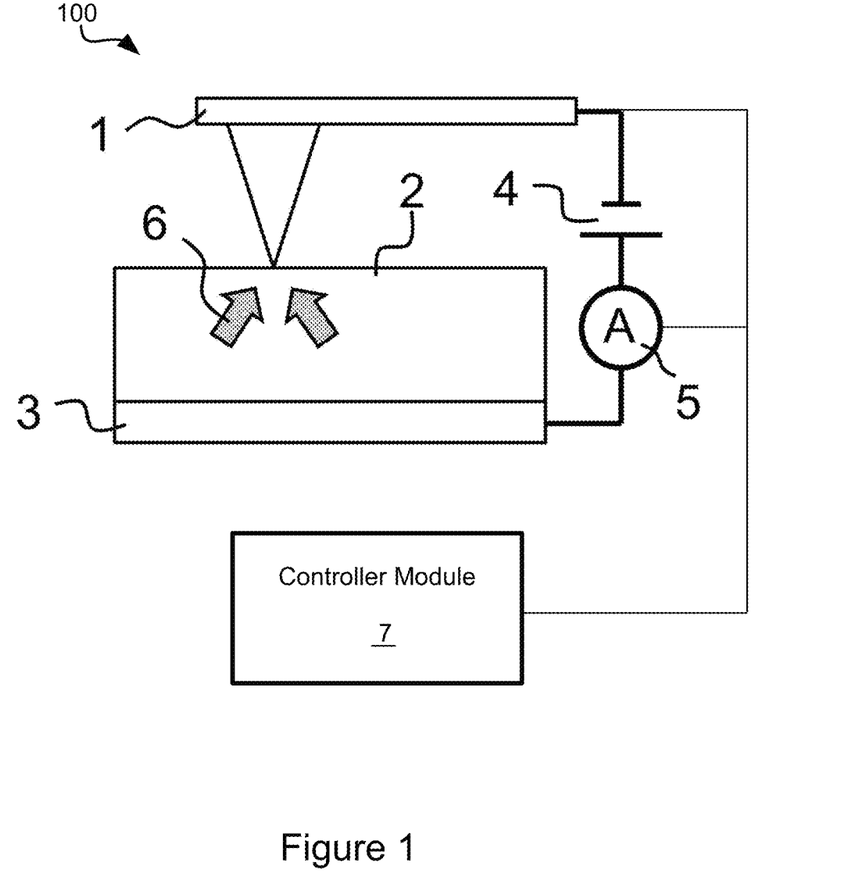
FIG. 1 is a scanning probe microscopy (SPM) test system circuit.

FIG. 1 illustrates a scanning probe microscopy (SPM) test system circuit 100 which may determine electrochemical activity in a specimen or material sample 2. The SPM test system 100 may include an atomic force microscopy (AFM) system. Spectroscopic and/or imaging processes may apply electrically varying bias voltage waveforms to the specimen 2 via a SPM cantilever with a conductive tip 1 and measuring a current response which is mediated by the specimen 2 to a bottom electrode 3. Various characteristics of the current response may provide information about electrochemical changes in the specimen 2.

The SPM cantilever with a conductive tip 1 may be simply referred to as a tip or a SPM tip. The SPM cantilever with a conductive tip 1 may be connected in the test system circuit 100 to a voltage source 4. In some systems, the SPM tip 1 may also operate as a current sensor. The SPM tip 1 may act as a sensor of a local property changes in the specimen 2 which may be related to electrochemical processes in the specimen 2 material.

In some systems, the SPM tip 1 may be made of metal which may correspond to an ideal polarizable blocking metal electrode. In some systems the SPM tip 1 may be made of metal in the presence of an external electrolyte or gas which may act as an ion source (in an ideal case, this may comprise a non-polarizable electrode). In other systems the SPM tip may be formed by electrolyte once imaging is performed in liquid environment.

The voltage source 4 may be operable to supply a bias voltage as an alternating waveform or a sweep, for example, the bias may comprise a unipolar triangular wave, a bipolar triangular wave, a sinusoidal wave and/or any other suitable waveform for testing electrochemical activity in the specimen 2. In some systems, a test waveform or sweep generated by the voltage source 4 may change in amplitude over time. For example, each successive cycle of a unipolar or bipolar waveform may increase in amplitude. Moreover, each successive sweep may end on a cycle with a different maximum voltage deviation. For example, each successive sweep may comprise a greater number of cycles of increasing voltage amplitude. The applied bias voltage may also be referred to as an excitation or a probe such as an excitation voltage or probing bias, for example. In some systems, a series of voltage sweeps may change in frequency over time. By varying the number of increasing voltage cycles applied or by varying the frequency of voltage sweeps, information about electrochemical activity and slow ion dynamics may be observed from current response reversal curves.

The specimen 2 may comprise a film of a material which may exhibit electrochemical activity as a result of the applied bias voltage. The specimen 2 may be attached or connected to one or more substrates of conductive material, for example, a bottom electrode 3. The bottom electrode 3 may be connected to the specimen 2 material. The bottom electrode 3 may be connected in the test system circuit 100 to the voltage source 4 through a current-measuring device.

In some systems, the specimen 2 may be connected or attached to a top electrode between the specimen 2 material and the SPM tip 1. In a top electrode test system 100, a probing bias may be applied between the macroscopic top and bottom electrodes which may establish a substantially uniform electric field through the specimen 2.

A current detecting device 5 may be included in the test system circuit 100 to measure the current response to the applied bias voltage, which is mediated by the specimen 2. The current response may be due to an ion flow, electron flow or a combination of ion and electron flows. The ion flow is represented in FIG. 1 by the arrows 6. In some systems, a lock-in detection technique may be utilized to obtain a dI/dV response or a current response.

The test system 100 may include additional components, such as additional circuitry, firmware and/or processing modules. For example, a controller module 7 and/or other modules in the test system 100 may comprise suitable logic, circuitry, interfaces and/or code that may be operable to determine and/or control bias waveforms and/or to map current reversal curves and/or areas of current reversal curves. Portions of test system 100 may be implemented by one or more integrated circuits (ICs) or chips.

In operation, the SPM tip 1 may concentrate an electric field in a nanoscale volume of the specimen 2 material which may result in one or more of gas-solid reactions, liquid-solid reactions, oxygen vacancy, proton injection, ionic diffusion and vacancy diffusion, for example. These processes may change the effective electrochemical properties of the specimen 2 material, for example, local resistivity, optical properties and electron-energy loss spectrum. In some instances, these electrochemical changes to the specimen 2 material may be reversible, for example, by applying an opposite polarity bias voltage. In some instances, these changes may be weakly or partially reversible, for example, application of the bias voltage may cause damage to the specimen 2 material, which may limit the number or extent of reversible cycles the specimen 2 may effectively undergo. In some instances, the changes may be irreversible.

Measurements in the test system 100 may be performed in a variety of environments. For example a testing environment may comprise ambient or controlled vapor pressure in which a liquid droplet may form at the tip 1 surface junction due to an electrocapillary effect. This may render the process reversible for some materials used in the specimen 2. Other exemplary test environments may comprise an ultrahigh vacuum or controlled atmosphere environment or liquid environments of aqueous, non-aqueous and ionic liquids, for example, within liquid electrolyte.

Figure 2:
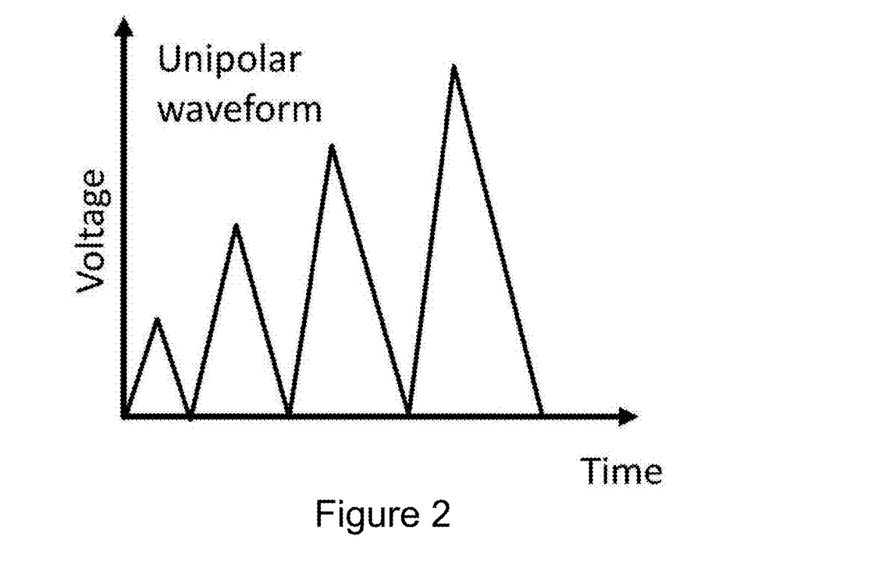
FIG. 2 is an exemplary unipolar electrical excitation voltage sweep.

FIG. 2 is a plot of an exemplary electrical excitation voltage sweep comprising a unipolar triangular modulated waveform with increasing amplitude over time which may be generated by the voltage source 4. The electrical excitation voltage sweep may also be referred to as a bias or voltage waveform. Each triangle or tooth of the waveform may have a maximum amplitude or a peak which may be positive or in other systems, may be negative. In the case of bipolar waveforms, peaks or maxima may be both positive and negative. In some systems, the sweep frequency may be slow relative to relaxation times of ionic diffusion in a local area of the sample material 2. In some systems the sweep frequency of the excitation voltage may be varied and measurements taken as a function of the sweep frequency may be utilized to determine dynamics of material changes and to acquire information about local kinetics of electrochemical reactions. Also, in some systems, an active feedback technique may be utilized to limit the number of cycles per excitation sweep. The feedback may indicate when hysteresis is detected in the current response. In this manner, the size of damage in the sample material 2 may be reduced by limiting the number of cycles of increasing voltage levels in a voltage sweep.

Figure 3:
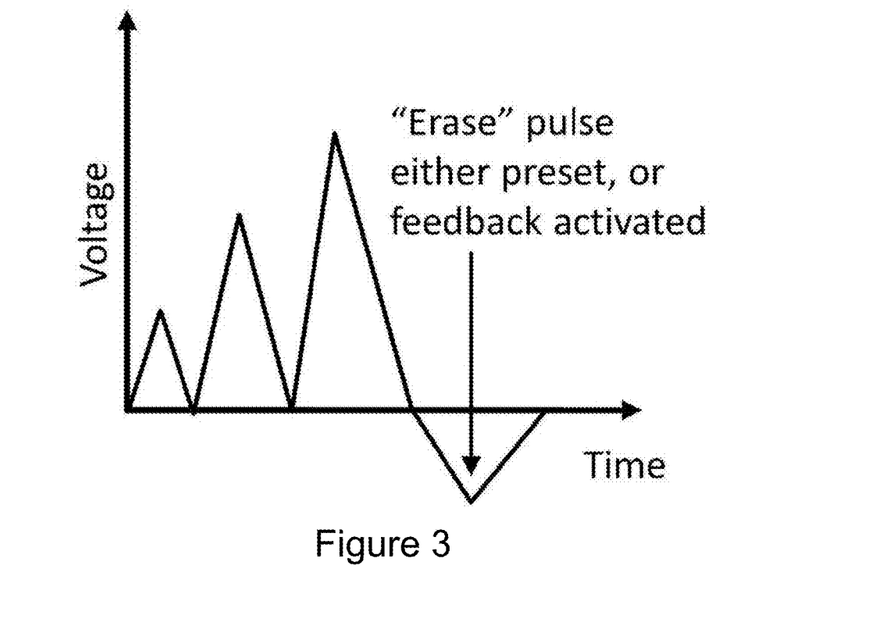
FIG. 3 is an exemplary unipolar electrical excitation sweep with an erase pulse at the end.

FIG. 3 is a plot of an exemplary unipolar electrical excitation sweep with increasing voltage over time and an added cycle of reverse polarity. Cycles of opposite polarity, which may be referred to as an erase cycle or pulse, may be applied after a sweep, for example, when electrochemical processes are detected in the material sample 2. The erase cycle may recover an initial or less damaged state in the material sample 2. A feedback technique may be utilized with the erase cycle to determine if it was successful in recovering an earlier or initial electrochemical state.

Figure 4:
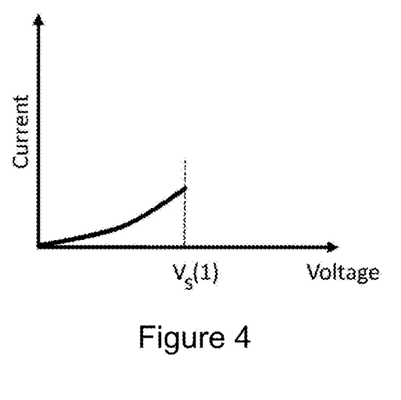
FIG. 4 is a reversal curve current response to the first triangle wave cycle of FIG. 2 with a maximal amplitude of $V_s(1)$.
Figure 5:
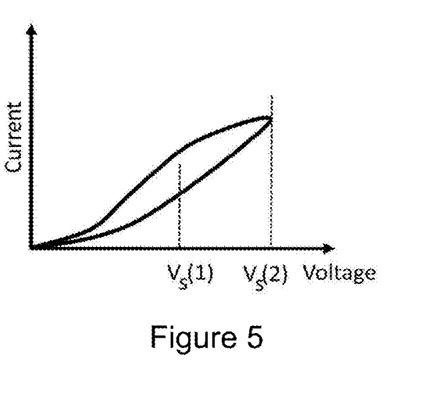
FIG. 5 is a reversal curve current response to the second triangle wave cycle of FIG. 2 with a maximal amplitude of $V_s(2)$.
Figure 6:
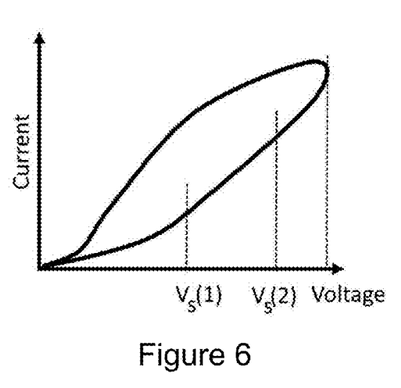
FIG. 6 is a reversal curve current response to the third triangle wave cycle of FIG. 2 with a maximal amplitude of $V_s(3)$.

FIGS. 4-6 are each plots of a current response to a cycle or period of an alternating bias voltage sweep which comprises cycles of increasing amplitudes. A series of triangular waves of increasing amplitude, for example, as shown in FIG. 2 are applied to the sample material 2. A current response reversal curve from a first triangle wave cycle with a maximal amplitude of Vs(1) is shown in FIG. 4. A current response reversal curve from a second triangle wave cycle with a maximal amplitude of Vs(2) is shown in FIG. 5. A current response reversal curve from a third triangle wave cycle with a maximal amplitude of Vs(3) is shown in FIG. 6. In FIG. 4, with maximal voltage Vs(1) the plot does not reveal any hysteresis. Thus the curve is the same in the forward and reverse direction of the voltage and current. This may indicate that under the conditions of the maximal excitation voltage Vs(1), electrochemical changes that occur in the sample material 2 are either absent, or reversible and very rapid. However, in FIGS. 5 and 6, the forward portions of the curves are different than the reverse portions of the curves which reveals hysteresis in the current response to the increasing excitation voltage amplitudes Vs(2) and Vs(3). The opening up of hysteresis loops in the current response as voltage amplitudes increase may indicate a persistence of electrochemical changes that occur in the material sample 2 when the limiting excitation amplitude of the series of triangular waves increases to Vs(2) or to Vs(3).

Figure 7:
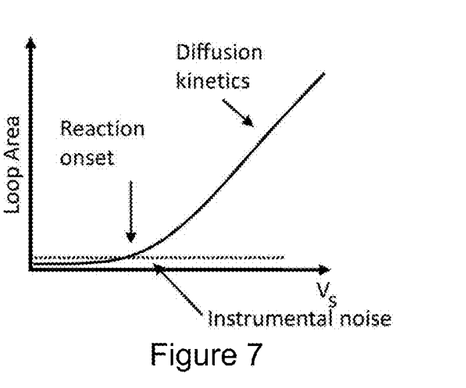
FIG. 7 is a loop area of current response hysteresis loops, over increasing maximal amplitudes of the triangular wave excitation voltages V.

FIG. 7 is a plot of loop areas for current response hysteresis loops, vs. the increasing maximal amplitudes of the triangular wave excitation voltages Vs. In FIG. 7, hysteresis loop areas increase as Vs increases, for example, when Vs exceeds a certain threshold, approximately equal to 2.5 V in this case. Below this threshold, shown as the reaction threshold of FIG. 7, hysteresis loop areas are smaller than the instrumentation noise level and are effectively zero. After the threshold Vs level, hysteresis loop areas begin to open up and the areas increase as Vs increases. This may indicate that as the peaks of the excitation voltage shown in FIG. 2, increase beyond a first threshold value, electrochemical changes in the sample material 2 may become increasingly less reversible. The point at which the current response hysteresis loops begin to open may be referred to as a critical bias corresponding to an onset of electrochemical processes or onset of slow ionic movement on the time scale of the experiment, in the sample material 2. At high bias voltages the average loop areas become small again. In the exemplary case of Ca—BFO this is due to switching of the studied areas to high electron conductance state. In general such leveling-off of the loop area vs. Vs bias may indicate irreversible changes in the system, for example, the material sample 2 surface may undergo dielectric breakdown. Thus, measurements may be taken between the onset of the current response hysteresis loop openings and a point where loop openings begin to close.

In some systems, the hysteresis loops may open because of thermodynamic changes and/or kinetic changes in the material sample 2. In the case of thermodynamic changes which may occur as a result of the application of the voltage bias waveform, new material may be formed in the sample material 2. For example, the new material may be formed by electrochemical nucleation. The newly formed material in the sample material 2 may possess different electrical properties. Therefore, by performing measurements using the first order reversal curves of the current response to the increasing bias voltage peaks, and extracting the area within the hysteresis loops, for example, by integration techniques, and plotting the loop areas as a function of the maximal voltage deviation per period or cycle, thermodynamic changes which occur at a specified location may be determined.

A kinetic change may indicate slower ion dynamics in the sample material 2 as a result of an applied bias voltage. In this regard, even when the sample material 2 is moved away from equilibrium by an application of a bias voltage in one direction, it may return to its ground state over a relaxation time which may depend on the material under test. However, the ions may move slowly relative to measurement times such that even though the system may return to its ground state, the ions do not reach the ground state within the time frame allowed by the voltage sweep frequency. Thus, the hysteresis loops may open up in the mapping of a current response. In some instances relaxation times may be too quick to take a desired measurement. In other systems, relaxation time may be very slow and a material under test may be left in a diffused state when a measurement is complete. However, other systems may have ionic relaxation times which are slow but still on a time scale relative to a duration of time used to take a measurement. These slow dynamics may provide information on electrochemical activity. A diffusion coefficient of the sample material 2 may be determined by the relationship of:

$$c = X^2 / T_d$$

Where c is the diffusion coefficient in $m^2 \cdot s^{-1}$, $T_d$ is the diffusion time in seconds and X is the system's characteristic length scale in m.

Diffusion length may be on a scale relative to a tip curvature radius or on a scale relative to the thickness of a film being measured, for example.

Current response measurements may be taken as a function of bias voltage sweep rate to obtain information about kinetics of ionic processes and/or relaxation time in the sample material 2. Measurements may be taken for a series of voltage bias sweeps as the frequency of the sweeps is varied where each sweep may include a specified number of voltage peaks. A sweep rate may indicate the time a tip may stay on a single point of the material sample. In some systems, frequency may be varied between about 1 Hz and 1 kHz, as limited by signal strength and data acquisition electronics. The resulting first order reversal curves of the current response may be plotted as a function of the sweep frequency to determine ionic kinetic information and/or ionic diffusion time at a specified location. In some systems, a material sample may have mixed conductivity and multiple relaxation times corresponding to different processes taking place in the material. However, the relaxation times which correspond with the tip voltages may be identified. In addition, current density may be detected and based on the current density and a thermal conductivity of material sample 2, a potential for thermal effects such as local heating and associated changes in local conductivity may be determined.

Figure 10:
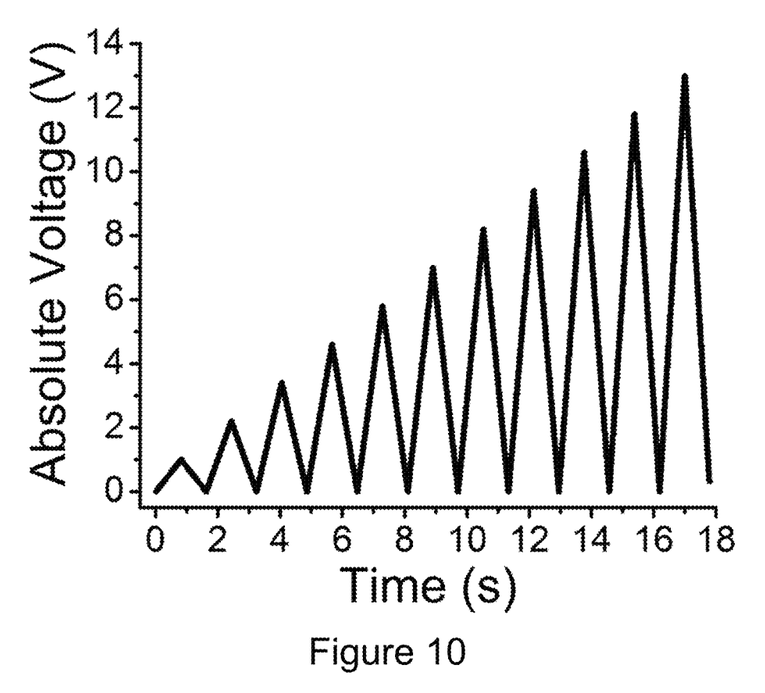
FIG. 10 is a unipolar excitation voltage bias waveform which is applied to a spatial grid of points on a Ca—BFO surface.
Figure 11:
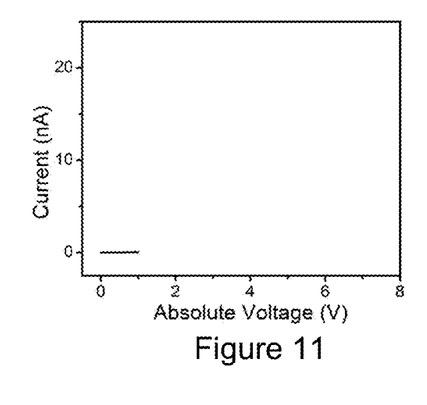
FIGS. 11-16 are plots of the first six current response hysteresis loops which are averaged over 60×60 grid points and plotted vs. an applied bias voltage.
Figure 12:
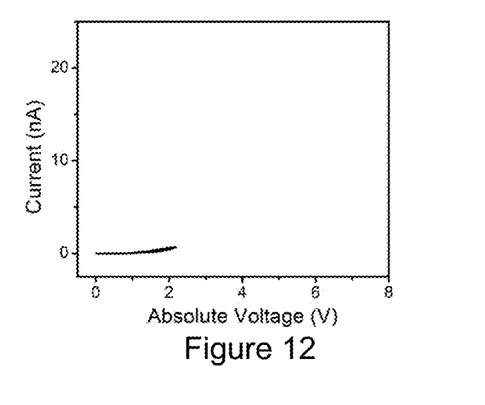
Figure 13:
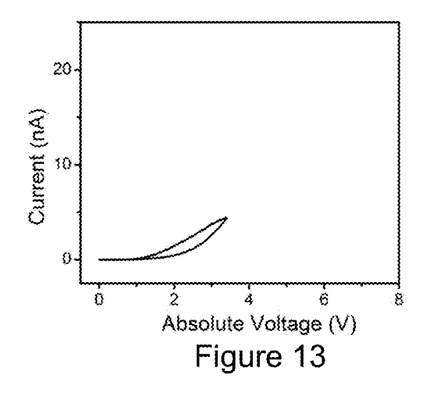
Figure 14:
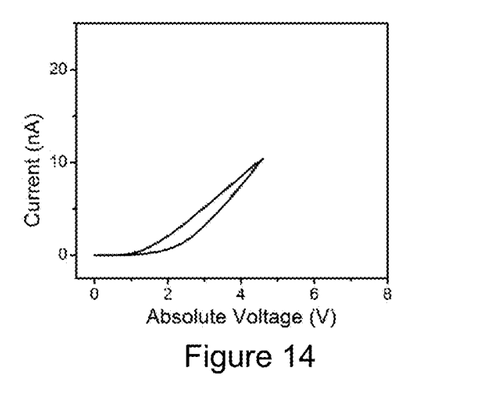
Figure 15:
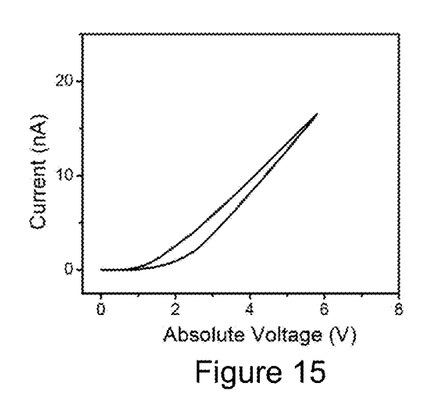
Figure 16:
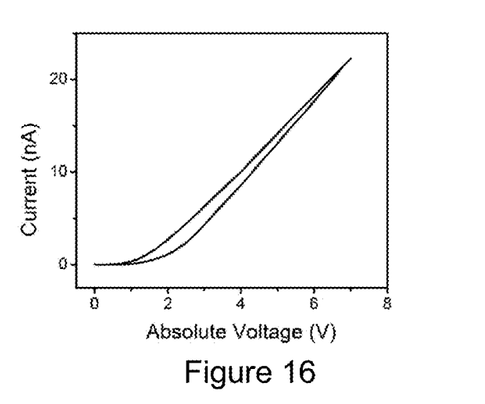
Figure 22:
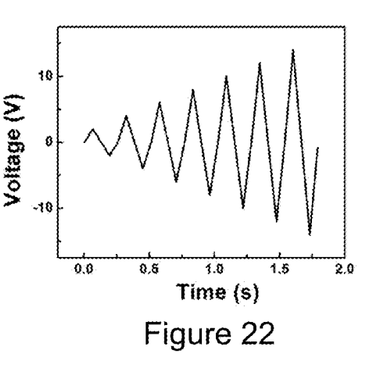
FIG. 22 is bipolar bias voltage sweep waveform which may be applied to a sample of NiO material.
Figure 23:
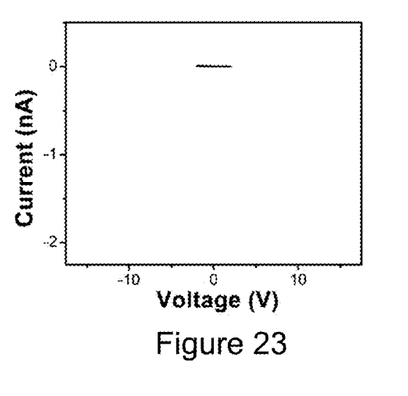
FIGS. 23-29 are averaged current response reversal curves measured on a moderately dense grid of 40×40 points over an area of 1×1 µm$^2$ on a thin film NiO sample for a pair of absolute value of maximal bias voltages in the bipolar bias signal of FIG. 22.
Figure 24:
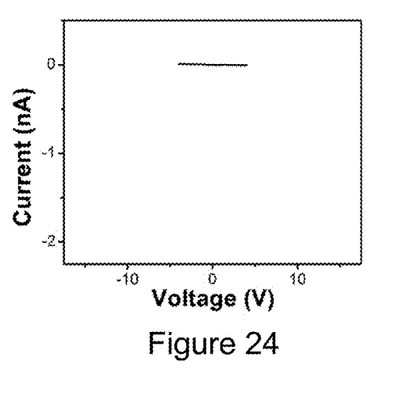
Figure 25:
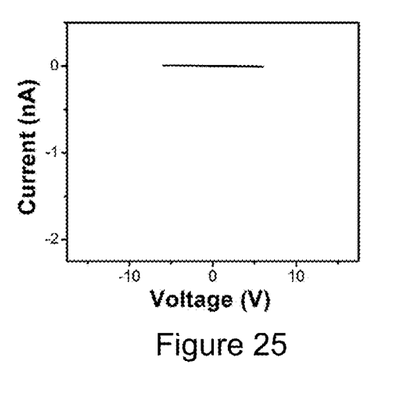
Figure 26:
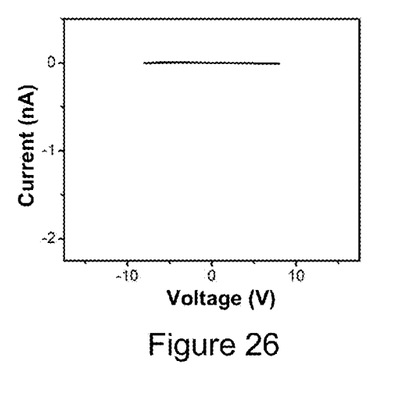
Figure 27:
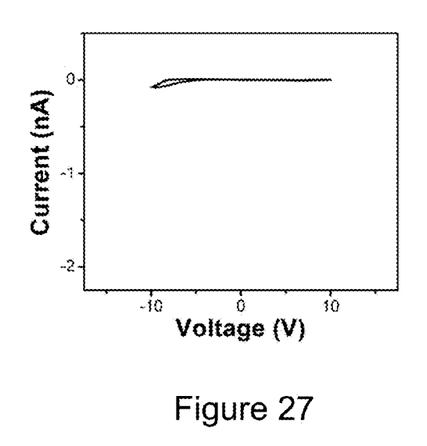
Figure 28:
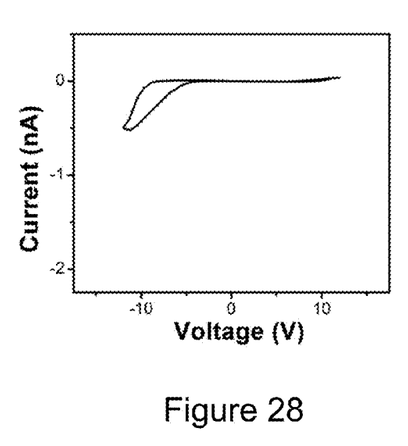
Figure 29:
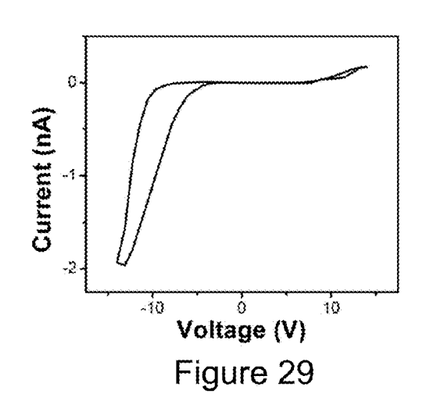

In operation, an electrical excitation bias voltage may be applied to the sample material 2 using a modulated waveform (either unipolar or bipolar) with increasing absolute voltage peaks as shown in FIGS. 2 and 3 (and FIGS. 10 and 22). The applied bias waveform may comprise cycles of increasing amplitude. Below a critical bias voltage cycle corresponding to an onset of electrochemical processes or slow processes on a time scale of the experiment, a response current reversal curve may not exhibit a significant hysteresis. As higher bias voltage amplitudes per cycle or per triangle, induce electrochemical transformations in the sample material 2, current response hysteresis loops may open up in the reversal curves. A measure of the hysteresis loop openings or areas may provide information on thermodynamic changes or kinetics at a specified location. Various environmental controls may comprise measurements as a function of temperature, measurements as function of ambience, for example, gas with a defined partial pressure of active component, liquid or ultra-high vacuum and measurements combined with dynamics probes, for example, local SPM tip induced heating.

The static and/or dynamic hysteretic loops related to electrochemical charge and/or discharge processes described with respect to FIGS. 1-7, may be obtained by an SPM tip at a single location on the sample material 2, or at a spatially resolved grid of points over the surface of sample material 2. SPM measurements taken on a spatial grid of points on the surface of the material sample 2 may enable spectroscopic imaging of the sample material 2. Spacing of the grid points or pixels may depend on a particular material being measured, the radius of the tip curvature or the thickness of a film which comprises the sample material 2, for example. In systems where a material breaks down as a result of an applied voltage in an area which is larger than the pixel size, measurements in surrounding pixels may be affected. For systems with irreversible processes, spectroscopic imaging measurements may be effective only on a sparse grid where the spacing between measurement points exceeds the spacing of the lateral size of the material area which is modified during a SPM tip measurement. In such systems with irreversible processes, use of an active feedback system where data acquisition may be stopped once hysteresis loop areas open, may be useful. For example, by stopping excitation voltage application once an underlying area in the material begins to change, the affected material area may be smaller and spatial grid resolution may be increased. These measurements may provide statistical information on electrochemical changes. For fully reversible and weakly reversible systems, for which material damage may be smaller than the area that undergoes reversible transformation, spectroscopic imaging may be performed on a dense grid in which pixel spacing may be significantly smaller than the size of excitation signal volume, allowing for high resolution imaging studies.

Detection methods for changes in material state induced by a slow switching waveform may utilize the current methods as described with respect to FIGS. 1-7 or different detection modalities may be utilized. For example, methods such as direct I-V and direct dI/dV detection, local Raman signal, electron energy loss spectrum (in electron microscopy environment), strain or electromechanical detection and optical reflectivity may be utilized.

In an exemplary spectroscopic mode experiment as described with respect to FIGS. 1-17, a partially or weakly reversible system may be measured on a moderately-dense grid. An exemplary test sample material is a thin (ca. 50 nm) film of Ca-doped (10%) bismuth ferrite (Ca—BFO) grown on top of a bi-layered substrate including $SrRuO_3$ and $SrTiO_3$. In this example, the bi-layered strontium ruthenate and strontium titinate substrate functions as a bottom electrode as shown in FIG. 1. However, the bottom electrode may comprise any suitable conductor. The doping level may stabilize pseudo-tetragonal crystallographic phase of Ca—BFO that may exist in two conductive states, with about an order of magnitude difference in conductivity between the two. A bias-induced switching between the conductive states may be a gradual and reversible process which may be governed by generation and/or re-distribution of oxygen vacancies within the oxide. Although limiting cases may be well-defined, there may exist a range of states of intermediate conductivity some of which may be stabilized naturally in the film defects during the growth process. An application of the spectroscopic technique described with respect to FIGS. 1-17 to such film regions may enable probing of local electrochemical activity.

Figure 8:
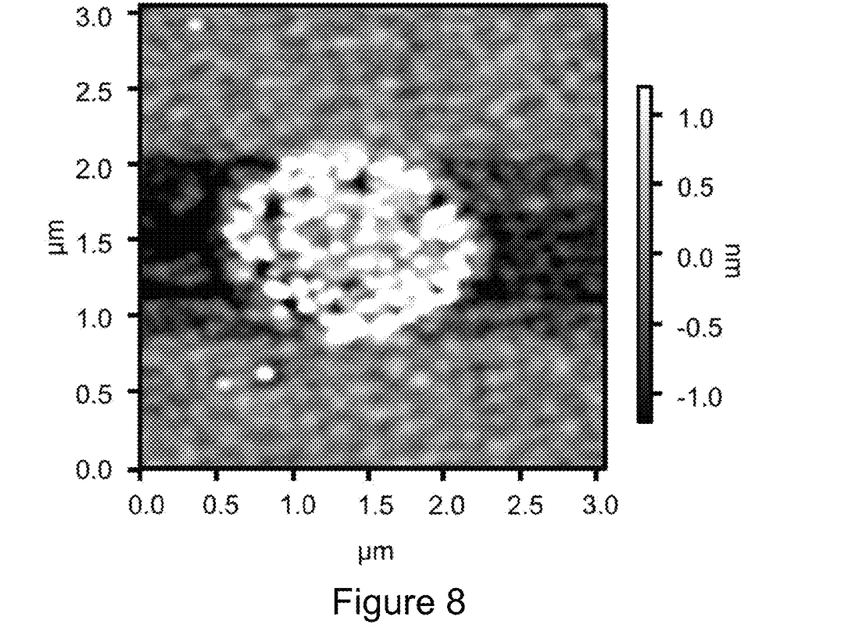
FIG. 8 is an image of surface defect topography in a Ca—BFO system with a gray scale corresponding to depth and height in nanometers.
Figure 9:
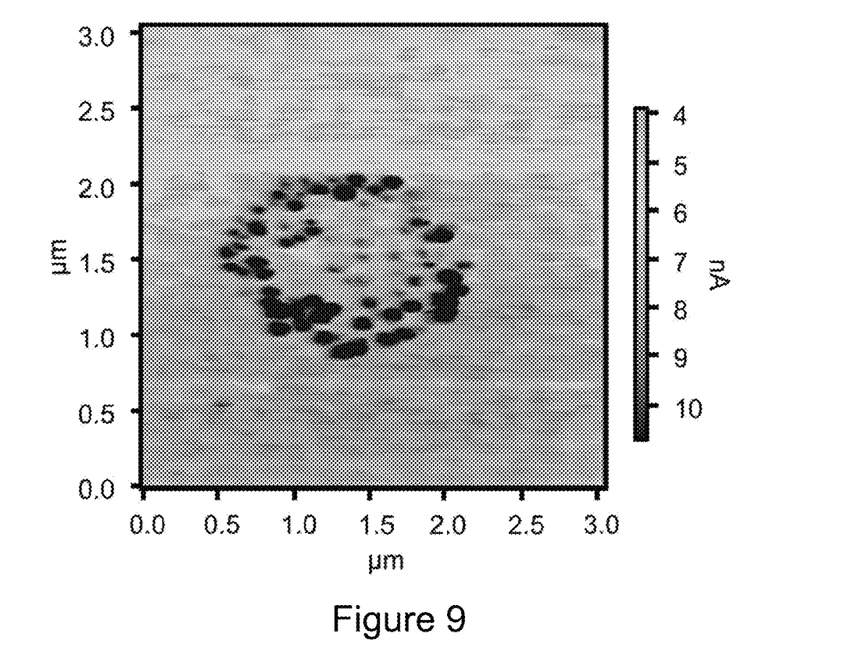
FIG. 9 is a current AFM map taken at −4 V applied to an AFM tip on the same region of the Ca—BFO surface shown in FIG. 8 and a gray scale for current in units of nano-Amps (nA).

FIG. 8 presents a topographic map of an elliptically-shaped surface defect on the Ca—BFO film with a gray scale corresponding to height difference in nanometers. FIG. 9 is a current map of the same Ca—BFO surface defect shown in FIG. 8 (taken at −4V) with a gray scale showing current in units of nanoamperes (nA). FIG. 9 reveals an annular distribution of high-conductive state grains in the Ca—BFO sample.

FIGS. 10-17 illustrate a unipolar spectroscopic imaging mode measurement process. A determined 3×3 μm region of the Ca—BFO surface shown in FIG. 8 was scanned with a negative-bias-fed conductive tip. A current response of the film to the excitation triangular voltage waveform or bias, with maxima ranging from 1 to 13V and with 11 triangles or teeth, was measured at all locations of a 60×60 spatial grid. FIG. 10 represents the excitation triangular voltage waveform which was applied to each grid point. The excitation triangular voltage waveform may be referred to as the excitation waveform or the bias waveform.

Figure 17:
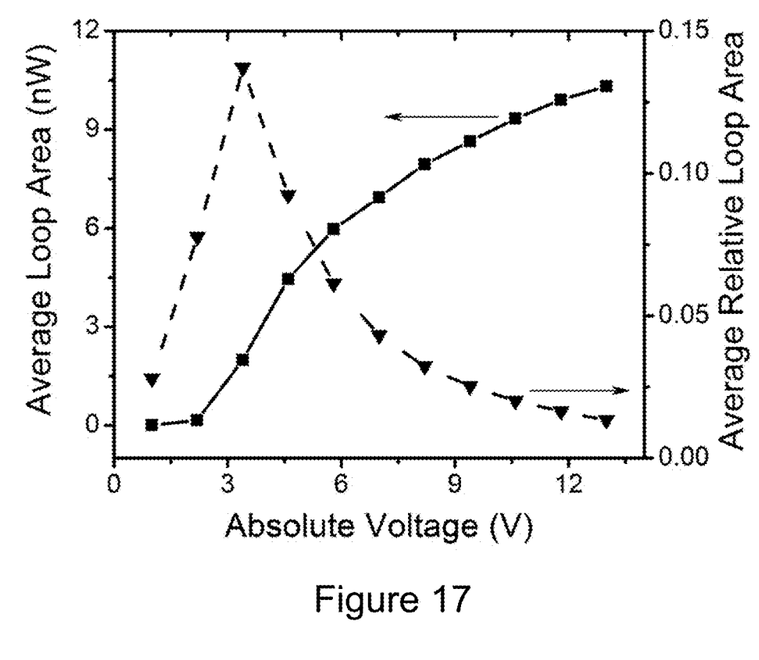
FIG. 17 is a graph of current-voltage loop area in units of nanowatts (nW), vs. absolute maximal amplitude of bias voltages and a plot of normalized average relative loop areas vs. the absolute maximal amplitude of bias voltages.

FIGS. 11-16 are 6 plots of averaged current response hysteresis loops, each corresponding to individual teeth of the excitation voltage waveform shown in FIG. 10 and each representing an average over all points in the spatial grid of the Ca—BFO sample. The averaged current response hysteresis loops are plotted vs. the applied excitation voltage. Loop openings in the response current loops vs. absolute bias voltage of FIGS. 11-16 appear when bias voltage peaks exceeds a particular threshold, for example, in this system, at about an absolute bias voltage peak of 2.2 V. The threshold determined from FIGS. 11-16 is also represented in the curves of FIG. 17. The current response curves may be referred to as current-voltage curves or current-voltage loops.

An area within each of the average current response hysteresis loops is determined and is plotted in FIG. 17 as a function of the absolute value of the maximal amplitude of the excitation voltage triangular waveform. A first plot of average current loop areas is indicated in units of nanowatts (nW) since the areas are determined as an integral of the difference in current (measured in nanoamperes (nA)) over voltage (V), where nA times V yields nW. Also shown in FIG. 17 is a plot of normalized average relative loop areas vs. the absolute value of the maximal amplitude of the excitation voltage triangular waveform. In order to render the values of the current loop areas comparable, the current loop areas which are taken for different triangles of the excitation waveform may be normalized to a product of the maximal excitation voltage per triangle and the corresponding current. Referring to FIG. 17, average relative loop areas decrease after a prolonged sweeping of unipolar bias or excitation voltage at one location in the material sample shown in FIG. 8. The prolonged sweeping of unipolar bias voltage in one location may lead to switching to the high-conductive state that may possess low electrochemical activity and therefore, the current response loops have miniscule hysteresis. Spectroscopic current response maps taken at bias voltage sweeps with different maximal bias voltages may not be equivalent. There may exist, a specified or optimal maximal bias voltage value at which a measurement-induced disturbance of the sample is low or minimal and thus, sensitivity of the technique to electrochemical activity is improved or maximal. This specified or optimal maximal bias value may enable observation of a difference in electrochemical activity at various loci in a material sample. This specified or optimal maximal bias voltage is also shown in FIGS. 18-21, at low and high sweeping biases spectroscopic maps look almost uniform, with no distinguishable features. At intermediate voltages, for example, −3.4V shown in FIG. 18, high-contrast images which may be insusceptible to noise are produced.

Figure 18:
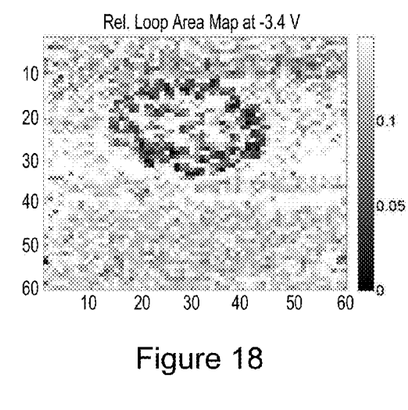
FIGS. 18-21 are spectroscopic maps of current-voltage loop areas on a Ca—BFO film defect where measurements are taken at each grid location of a 60×60 grid and for each figure, voltage sweeps terminate after different absolute peak bias voltage.
Figure 19:
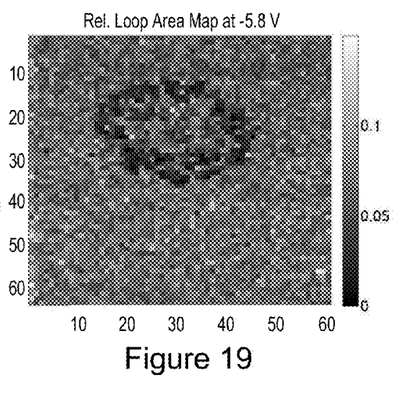
Figure 20:
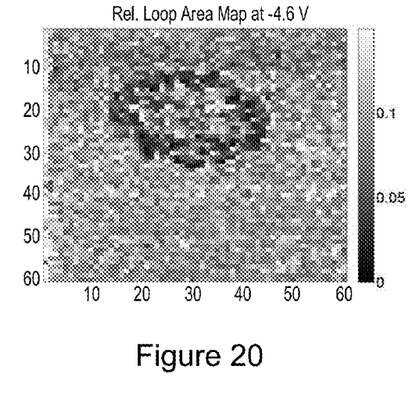
Figure 21:
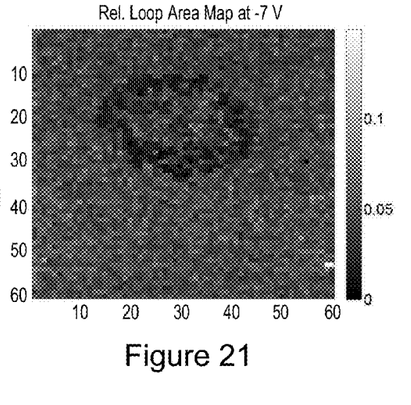

FIGS. 18-21 comprise spectroscopic maps of a Ca—BFO film defect where measurements are taken at each grid location and for each figure, voltage sweeps terminate after a different absolute peak bias voltage. FIGS. 18-21 represent relative current-voltage loop areas taken for triangle waves of the voltage sweep with peaks of −3.4V, −4.6V, −5.8V and −7V respectively. A gray scale represents levels of relative current-voltage loop areas for the maps as shown in FIGS. 18-21. The mapped current-voltage loop areas shown FIGS. 18-21 may look similar but represent different information than the image of current map in FIG. 9. This is because FIGS. 18-21 represent areas of the hysteresis loop current-voltage curves of the current response rather than simple current measurements. As described with respect to FIG. 17, in the spectroscopic maps of the Ca—BFO material sample, for unipolar bias cycles with lower voltage peaks or with higher voltage peaks, the spectroscopic maps are more uniform over the spatial grid. However, at intermediate voltages, a higher contrast among the grid pixels may be seen which may be insusceptible to noise images. For example, FIG. 18 corresponds to an intermediate bias voltage peak of −3.4V, which reveals the greatest hysteresis loop areas averaged over the spatial grid (FIG. 17) and the greatest contrast between the grid pixels (FIG. 18).

FIGS. 22-30 represent an application of bi-polar spectroscopic mode measurements to a NiO sample material system. This second exemplary sample comprises a thin film (approximately 50 nm) of NiO grown atop of a bi-layered $SrRuO_3$ and SrTiO3 substrate. In this example, the bi-layered strontium ruthenate and strontium titinate substrate acts as a bottom electrode as shown in FIG. 1. However, the bottom electrode may comprise any suitable conductor. NiO is considered to be one of the resistive switching materials in which switching may be governed by electrochemical behavior. The NiO sample material may be viewed as a partially or weakly reversible system and therefore; a bipolar spectroscopic mode measurements may be done over a moderately dense grid.

FIG. 22 represents bipolar bias voltage waveform which may be applied to the NiO material sample. The sweeps may comprise increasing deviations from a base level, such as zero. Cycles of the sweep may have different maximal voltage deviations, for example, 2V, 4V, 6V, 8V, 10V, 12V and 14V. Other voltages may be utilized, for example, depending on the system under test.

FIGS. 23-29 each represent a current response reversal curve averaged over a moderately dense grid, for example, a 40×40 grid on an area of 1×1 $\mu m^{2}$ on the NiO thin film sample for a pair including up-down bipolar sweeps with the same absolute maximal bias voltage. The average current responses shown in FIGS. 23-29 correspond to the increasing maximal bias voltages having maxima of 2V, 4V, 6V, 8V, 10V, 12V and 14V respectively. Since the average current responses shown in FIGS. 23-29 correspond to bipolar voltage biases applied to the sample, hysteresis current loops may open over a negative range of voltages below a certain threshold, may close-off over voltages nearer to zero and may open again over a positive range of voltages above a certain threshold.

Figure 30:
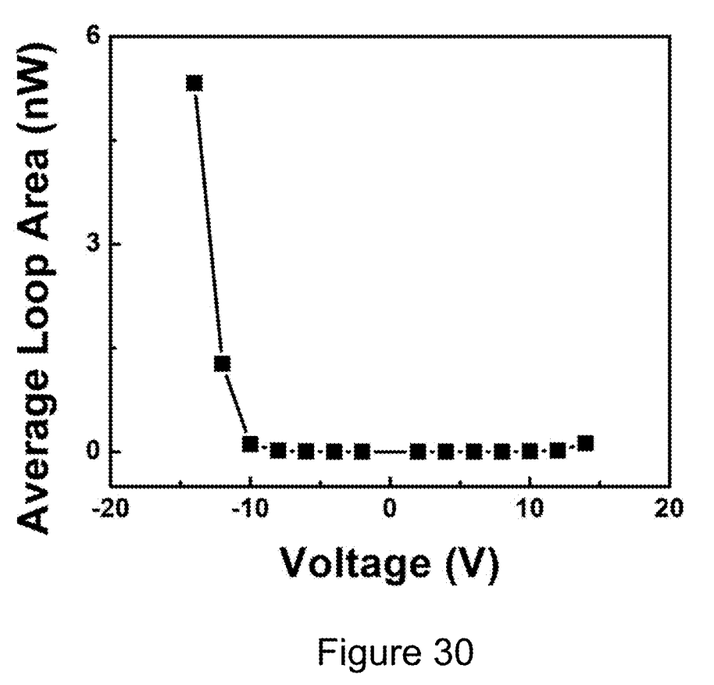
FIG. 30 comprises average current response loop areas plotted vs. applied peak voltage biases of the waveform shown in FIG. 22.

FIG. 30 is a plot of average current-response loop areas plotted vs. the maxima values of the voltage waveform. Similar to the unipolar measurements of FIG. 17, there may exist threshold peak voltage values (in this case both positive and negative) beyond which current-voltage loop areas become higher than the noise level. FIG. 30 shows one such threshold at negative bias of −10 V. The positive threshold in this case lies at about +15 V which is close to the bias value that causes irreversible electrochemical transformation of the sample. This bi-polar method provides an opportunity to determine electrochemical behavior dependence on the polarity of applied bias voltages.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method of mapping ionic diffusion or electrochemical reactivity comprising:
applying an electrical excitation voltage to each of one or more nanoscale volumes of material, wherein said electrical excitation voltage comprises one or more sweeps of a modulated voltage waveform and said modulated voltage waveform comprises cycles of increasing maximal amplitudes over time;
measuring an electric current response induced by said electrical excitation voltage at each of said one or more nanoscale volumes of said material;
mapping reversal curves of said electric current response induced by said electrical excitation voltage, over a range of voltage which corresponds to said maximal amplitudes, for each of said cycles of increasing maximal amplitudes over time, to determine characteristics of said ionic diffusion or said electrochemical reactivity in said material;
determining a spatial grid of locations over said material;
applying said electrical excitation voltage to each said one or more nanoscale volumes of said material at each location of said spatial grid, by a scanning probe microscope tip, wherein said electrical excitation voltage comprises said one or more sweeps of said modulated voltage waveform, and said modulated voltage waveform comprises said cycles of increasing maximal amplitudes over time;
measuring said electric current response induced by said electrical excitation voltage at each of said one or more nanoscale volumes of said material at each said location of said spatial grid;
determining an average reversal curve over said locations of said spatial grid, for each cycle of said modulated voltage waveform; and
mapping said average reversal curves over said range of voltage which corresponds to said maximal amplitudes, for each cycle of said modulated voltage waveform.

2. The method of claim 1, wherein said material comprises an ionic conductor or a mixed electronic-ionic conductor.

3. The method of claim 1, wherein said cycles of said modulated voltage waveform have a period comparable to diffusion time which is characteristic of slow mobile ions in said material.

4. The method of claim 1 further comprising, determining an area of each of said average reversal curves, said average is taken over said locations of said spatial grid for each cycle of said modulated voltage waveform and mapping said areas of said average reversal curves over said range of voltage which corresponds to said maximal amplitudes.

5. The method of claim 1 further comprising, determining a first threshold cycle comprising a corresponding first threshold maximal amplitude of said modulated voltage waveform which indicates onset of said ionic diffusion or said electrochemical reactivity, based on said areas of said average reversal curves mapped over said range of voltage which corresponds to said maximal amplitudes.

6. The method of claim 1 further comprising, determining a second threshold cycle comprising a corresponding second threshold maximal amplitude of said modulated voltage waveform which indicates an ending of said ionic diffusion or said electrochemical reactivity, based on said areas of said average reversal curves over said range of voltage which corresponds to said maximal amplitudes.

7. The method of claim 1 further comprising determining a resolution of said spatial grid based on an active feedback system wherein said application of said electrical excitation voltage in a particular location of said spatial grid is stopped when hysteresis is detected in said electric current response.

8. A system for mapping ionic diffusion or electrochemical reactivity comprising:
a scanning probe operable to apply an electrical excitation voltage to each of one or more nanoscale volumes, wherein said electrical excitation voltage comprises one or more sweeps of a modulated voltage waveform and said modulated voltage waveform comprises cycles of increasing maximal amplitudes over time;
a current detector which is operable to measure an electric current response induced by said electrical excitation voltage at each of said one or more nanoscale volumes; and
one or more circuits which are operable to map reversal curves of said electric current response induced by said electrical excitation voltage, over a range of voltage which corresponds to said maximal amplitudes, for each of said cycles of increasing maximal amplitudes over time, to determine characteristics of said ionic diffusion or said electrochemical reactivity in said material;
wherein said one or more circuits are operable to determine a spatial grid of locations on said material;
said scanning probe is operable to apply said electrical excitation voltage to each of said one or more nanoscale volumes of said material, at each location of said spatial grid, wherein said electrical excitation voltage comprises said one or more sweeps of said modulated voltage waveform, and said modulated voltage waveform comprises said cycles of increasing maximal amplitudes over time;
said current detector is operable to measure said electric current response induced by said electrical excitation voltage at each of said one or more nanoscale volumes of said material at each said location of said spatial grid;

said one or more circuits are operable to determine an average reversal curve over said locations of said spatial grid, for each cycle of said modulated voltage waveform; and map said average reversal curves over said range of voltage which corresponds to said maximal amplitudes, for each cycle of said modulated voltage waveform.

9. The system of claim 8, wherein said material comprises an ionic conductor or a mixed electronic-ionic conductor.

10. The system of claim 8, wherein said cycles of said modulated voltage waveform have a period comparable to diffusion time which is characteristic of slow mobile ions in said material.

11. The system of claim 8 wherein said one or more circuits are operable to determine an area of each of said average reversal curves, said average is taken over said locations of said spatial grid for each cycle of said modulated voltage waveform and map said areas of said average reversal curves over said range of voltage which corresponds to said maximal amplitudes.

12. The system of claim 8 wherein said one or more circuits are operable to determine a first threshold cycle comprising a corresponding first threshold maximal amplitude of said modulated voltage waveform which indicates onset of said ionic diffusion or said electrochemical reactivity, based on said areas of said average reversal curves mapped over said range of voltage which corresponds to said maximal amplitudes.

13. The system of claim 8 wherein said one or more circuits are operable to determine a second threshold cycle comprising a corresponding second threshold maximal amplitude of said modulated voltage waveform which indicates an ending of said ionic diffusion or said electrochemical reactivity, based on said areas of said average reversal curves over said range of voltage which corresponds to said maximal amplitudes.

14. The system of claim 8 wherein said one or more circuits are operable to determine a resolution of said spatial grid based on an active feedback system wherein said application of said electrical excitation voltage in a particular location of said spatial grid is stopped when hysteresis is detected in said electric current response.

* * * * *